May 17, 1938.　　　　　G. E. ATKINS　　　　2,117,692
BATTERY BOX
Filed Jan. 23, 1936
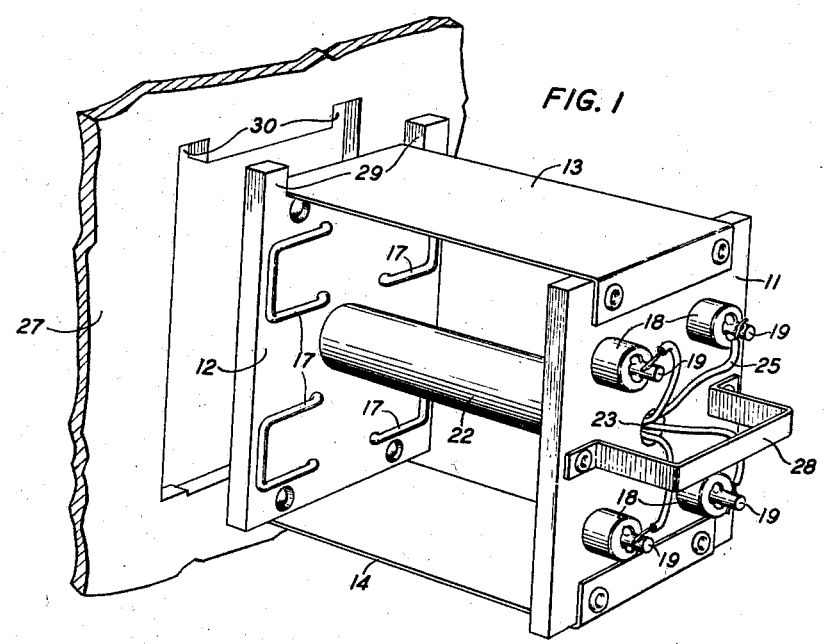
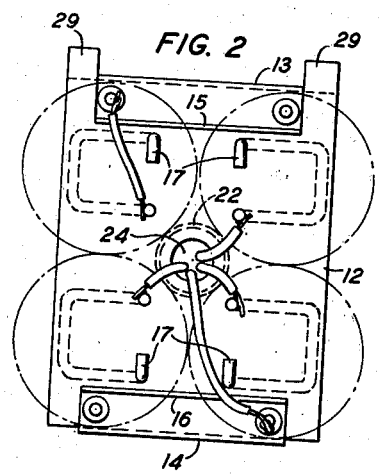
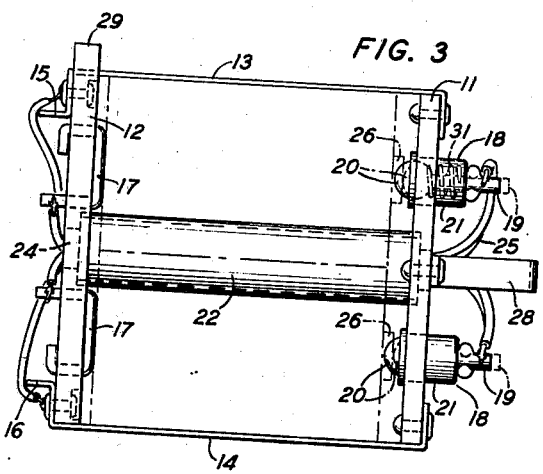
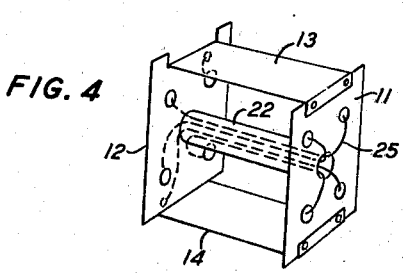
INVENTOR
G. E. ATKINS
BY
ATTORNEY Patented May 17, 1938

2,117,692

UNITED STATES PATENT OFFICE 2,117,692

BATTERY BOX

George E. Atkins, Glen Ridge, N. J., assignor to Bell Telephone Laboratories, Incorporated, New York, N. Y., a corporation of New York Application January 23, 1936, Serial No. 60,402

2 Claims. (Cl. 136—173)

This invention relates to battery boxes and the object of the invention is an inexpensive battery box which will hold a plurality of cells in place and which is so constructed that the cells may be readily replaced.

The battery box according to this invention is open at two sides to receive the battery cells and comprises a pair of end plates held in spaced relation by two oppositely disposed side members. One of the plates has fixed contacts and the other, retractable contacts which hold the cells in place. A centrally disposed spacing member, such as a tube extending between the plates, aligns the cells with the contacts when they are inserted through the open sides of the box and this tube may also serve as a conduit for the conductors interconnecting the contacts in the end plates.

This box is particularly adapted for use with portable apparatus requiring dry cells for its operation. The side members may be metallic plates which slide into contact with terminals of the work circuit and in cases where polarity is important one of the end plates may be so shaped that the box can be inserted in the apparatus only with the proper polarity.

In the drawing

Fig. 1 is a perspective view of a battery box according to the invention;

Figs. 2 and 3 are back and side views respectively; and

Fig. 4 is a wiring diagram showing the connections between the contacts and their arrangement in the box.

The end plates 11 and 12 of hard rubber or other suitable insulating material are held in the proper spaced relation by the brass side members 13 and 14 which have rear projections 15 and 16 for engaging the casing of the apparatus with which the box is used and keeping the contacts 17 out of contact with the casing. These rear contacts are preferably fixed and may be very inexpensively formed from small brass rod material disposed out of alignment with the corresponding front contact and shaped to engage only the flat bottoms of the cells which are indicated by broken lines in Fig. 2. As will be seen from the drawing, if a cell is inserted in reverse position with the central electrode at the back of the box, the cells will be held in place with the central electrode disposed within the loop of the contact 17 and no circuit is made.

The pressure contacts 18 may be friction furniture catches of the well-known type in which the plunger 19 terminates in a semispherical end piece 20 which is normally held in its extended position by a spring 31 within the casing 21. The brass tube spacing member 22 is countersunk into the end plates 11 and 12 and is aligned with the holes 23 and 24 in the plates so that the tube may serve as a conduit for the conductors 25 which connect the contacts 17 and 18 to give a series or other desired connection of the cells.

The structure is so proportioned that when the cells to be used are inserted through the open sides of the box, the tube 22 spaced them with the center electrodes 26 in alignment with the semispherical end pieces 20 of the contacts 18 as shown in Figs. 2 and 3. One of the front contacts is permanently connected to one of the metallic side members and one of the back contacts is connected to the other side member as shown in Fig. 2 and when the box is inserted into the cabinet 27 of the apparatus with which it is to be used these end members 11 and 12 preferably slide into engagement with the proper terminals (not shown) of the work circuit. A handle 28 is provided for convenience in inserting or withdrawing the box and when polarity is important the box is polarized with respect to the opening in the cabinet 27 so that the box can be inserted only in the proper way. For example, the battery box may have projections 29 on the plate 12 which engage corresponding indentations 30 in the opening in the casing.

While the invention has been described with reference to a particular embodiment, it will be understood that various modifications may be made within the scope of the following claims to adapt the box for a larger or smaller number of cells or for a different circuit arrangement as required.

What is claimed is:

1. A battery box open at two sides to receive the battery cells and having spaced end plates of insulating material, a plurality of fixed contacts in one of the plates, a plurality of retractable contacts in the other plate, a centrally disposed, tubular conduit extending between the plates for conductors interconnecting the contacts, and two oppositely disposed, electrically conductive side walls for the box, each wall being connected to one of the contacts and forming with the conduit means for automatically aligning each battery cell with the contacts when the cell is inserted through the open side of the box.

2. A battery box comprising a frame including insulating end pieces carrying contacts for the cells of a battery and electrically conductive plane side walls holding the end pieces in spaced relation and constituting the output terminals of the box, and being adapted to be inserted in an opening in a housing to contact the terminals of a work circuit therein, one of the end pieces of the box having a projection for engaging a recess in the wall of the opening in the housing so that the box may be inserted in the housing only with the desired polarity with respect to the work circuit.

GEORGE E. ATKINS.